(12) United States Patent
Liu et al.

(10) Patent No.: US 9,529,912 B2
(45) Date of Patent: Dec. 27, 2016

(54) METADATA QUERYING METHOD AND APPARATUS

(71) Applicant: Huawei Technologies Co., Ltd., Shenzhen, Guangdong (CN)

(72) Inventors: Qiang Liu, Chengdu (CN); Chengwei Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 372 days.

(21) Appl. No.: 14/094,156

(22) Filed: Dec. 2, 2013

(65) Prior Publication Data
US 2014/0089318 A1 Mar. 27, 2014

Related U.S. Application Data

(63) Continuation of application No. PCT/CN2013/073519, filed on Mar. 30, 2013.

(30) Foreign Application Priority Data

Apr. 10, 2012 (CN) .......................... 2012 1 0102935

(51) Int. Cl.
*G06F 17/30* (2006.01)
*G06F 7/00* (2006.01)

(52) U.S. Cl.
CPC ... *G06F 17/30864* (2013.01); *G06F 17/30321* (2013.01); *G06F 17/30952* (2013.01); *G06F 17/30997* (2013.01)

(58) Field of Classification Search
CPC ................... G06F 17/30864; G06F 17/30321; G06F 17/30952; G06F 17/30997
See application file for complete search history.

(56) References Cited

U.S. PATENT DOCUMENTS

| 5,404,510 A | 4/1995 | Smith et al. |
| 8,392,384 B1 * | 3/2013 | Wu .................. G06F 17/30156 707/693 |
| 8,799,238 B2 * | 8/2014 | Eshghi ............... G06F 11/1453 707/692 |

(Continued)

FOREIGN PATENT DOCUMENTS

| CN | 1530860 A | 9/2004 |
| CN | 1670726 A | 9/2005 |

(Continued)

*Primary Examiner* — Jeffrey A Burke
(74) *Attorney, Agent, or Firm* — Leydig, Voit & Mayer, Ltd.

(57) ABSTRACT

Embodiments of the present invention provide a metadata querying method and apparatus. The method includes: sampling at least one piece of first metadata from to-be-searched-for metadata; using at least a part of feature values in each piece of the sampled first metadata as an index, and searching a sparse index table preset in a memory for a corresponding container identifier; selecting, according to the number of times that a same container identifier is found, a container corresponding to a container identifier that meets a set condition; loading metadata in the selected container into a metadata cache; and searching the metadata cache for a data block that is the same as the to-be-searched-for metadata. In the embodiments of the present invention, querying performance can be improved and occupied memory space can be reduced.

4 Claims, 4 Drawing Sheets

(56) References Cited

U.S. PATENT DOCUMENTS

2003/0074341 A1    4/2003  Blackburn et al.
2004/0244039 A1   12/2004  Sugahara et al.
2008/0208891 A1    8/2008  Wang et al.

FOREIGN PATENT DOCUMENTS

| CN | 100357943 C | 12/2007 |
| CN | 101944134 A | 1/2011 |
| CN | 102663090 A | 9/2012 |
| EP | 1569138 A1 | 8/2005 |
| WO | 2011159322 A1 | 12/2011 |

\* cited by examiner

METADATA QUERYING METHOD AND APPARATUS

CROSS-REFERENCE TO RELATED APPLICATIONS

This application is a continuation of International Patent Application No. PCT/CN2013/073519, filed on Mar. 30, 2013, which claims priority to Chinese Patent Application No. 201210102935.1, filed on Apr. 10, 2012, both of which are hereby incorporated by reference in their entireties.

TECHNICAL FIELD

The present invention relates to the storage technologies, and in particular to a metadata querying method and apparatus.

BACKGROUND

Data deduplication, also referred to as intelligent compression or single instance storage, is a storage technology for automatically searching for duplicate data, retaining only one copy of same data, and replacing another duplicate copy with a pointer pointing to the unique copy, so as to eliminate redundant data and reduce a storage capacity requirement.

A metadata querying solution in an existing data deduplication technology includes the following: a metadata cache (Metadata Cache), a Bloom filter (Bloom Filter), a full index table (Full Index Table), and a container (Container), where the Metadata Cache is used to cache metadata; the Bloom Filter is used to filter new data blocks to reduce the number of times disk is accessed; the Full Index Table is used to index a storage position of metadata in the disk; and the Container is used to store a data block and metadata after deletion of duplicate data.

An existing metadata querying process is as follows: a metadata cache is first searched for a piece of metadata (Metadata) to be queried; if the same metadata is found in the cache, a block corresponding to the metadata is a duplicate block; if the same metadata is not found in the cache, the Bloom filter is searched; if the same metadata is not found in the Bloom filter, the corresponding block is a new block; if the metadata is in the Bloom filter, the index table is searched for a corresponding container; if the corresponding container is found in the index table, the corresponding block is a duplicate block, and all metadata in the corresponding container is loaded into the cache.

However, the index table in the prior art is a full index table including indices of metadata of all blocks. Such an index table occupies extremely large space, and therefore, storing it on a disk leads to a large number of disk IO operations. As a result, querying performance is degraded.

SUMMARY

Embodiments of the present invention provide a metadata querying method and apparatus, to improve querying performance and reduce occupied memory space.

An embodiment of the present invention provides a metadata querying method, including sampling at least one piece of first metadata from to-be-searched-for metadata, using, as an index, at least a part of feature values in each piece of the first metadata obtained after the sampling, and searching a sparse index table preset in a memory for a corresponding container identifier, where the sparse index table records container identifiers, and a location index of each container identifier in the index table is at least a part of feature values of metadata stored in a container corresponding to the container identifier, selecting, according to the number of times that a same container identifier is found, a container corresponding to a container identifier that meets a set condition, loading metadata in the selected container into a metadata cache, and searching the metadata cache for a data block that is the same as the to-be-searched-for metadata.

An embodiment of the present invention provides a metadata querying apparatus, including a sampling module, configured to sample at least one piece of first metadata from to-be-searched-for metadata, a determining module, configured to use at least a part of feature values in each piece of the sampled first metadata obtained by the sampling module as an index, and search a sparse index table preset in a memory for a corresponding container identifier, where the sparse index table records container identifiers, and a location index of each container identifier in the index table is at least a part of feature values of metadata stored in a container corresponding to the container identifier, a selecting module, configured to select, according to the number of times that a same container identifier is found, a container corresponding to a container identifier that meets a set condition, a loading module, configured to load metadata in the selected container into a metadata cache, and a searching module, configured to search the metadata cache for a data block that is the same as the to-be-searched-for metadata.

As can be seen from the technical solutions, in the embodiments of the present invention, a sparse index table is adopted and the sparse index table is set in a memory. This avoids a disk IO operation and improves querying performance. In addition, no Bloom filter is set, which reduces occupied memory space.

DESCRIPTION OF EMBODIMENTS

Figure 1:
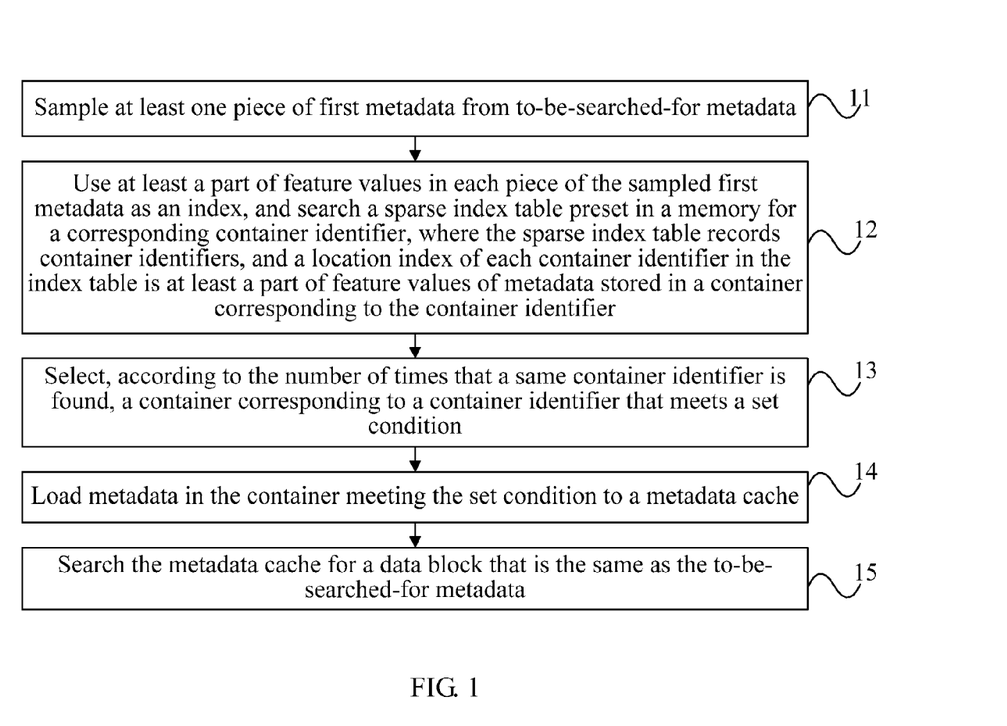
FIG. 1 is a schematic flowchart of a metadata querying method according to an embodiment of the present invention.

FIG. 1 is a schematic flowchart of a metadata querying method according to an embodiment of the present invention. The method includes:

Step 11: Sample at least one piece of first metadata from to-be-searched-for metadata.

Figure 2:
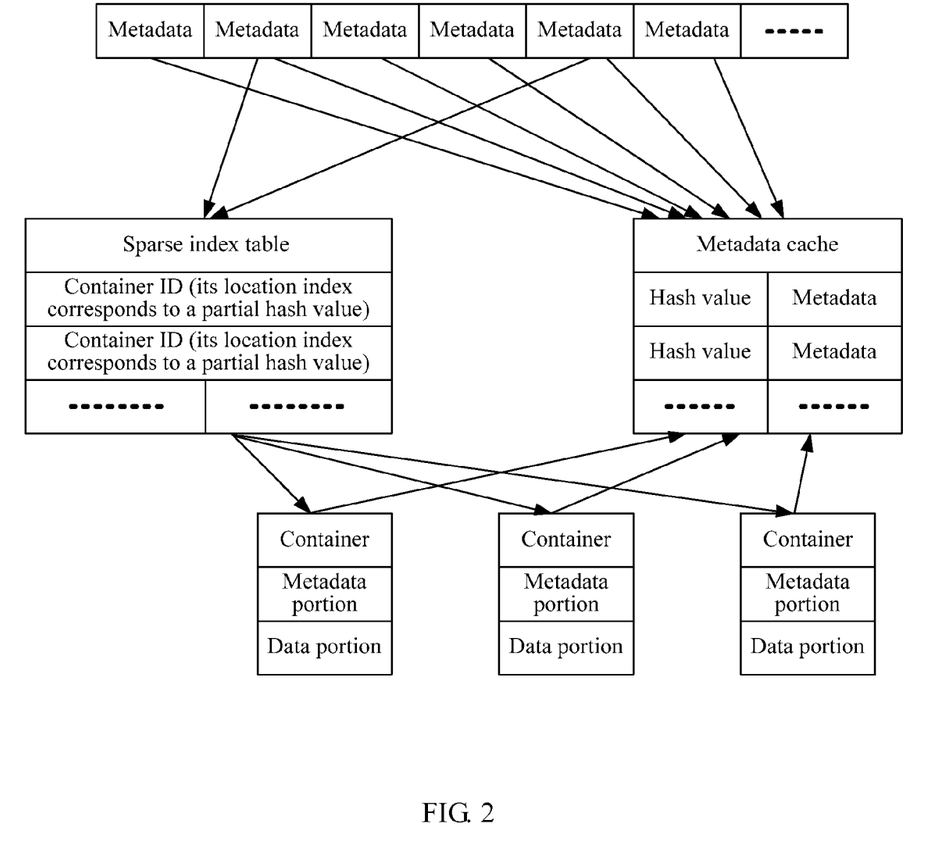
FIG. 2 is a schematic structural diagram corresponding to a metadata querying method in the present invention.

For example, in reference to FIG. 2, there are six pieces of to-be-searched-for metadata in FIG. 2. The second piece and the fifth piece may be sampled from the metadata, and the second piece and the fifth piece are used as the first metadata.

A specific sampling method may be as follows: classify the to-be-searched-for metadata into groups. For example, sequentially select the same number of pieces of metadata from the to-be-searched-for metadata as a group. Sample one piece of metadata from each group. For example, select a piece of metadata with a smallest hash value from each group as sampled metadata.

Step 12: Use at least a part of feature values in each piece of the sampled first metadata as an index, and search a sparse index table preset in a memory for a corresponding container identifier, where the sparse index table records container identifiers, and a location index of each container identifier in the index table is at least a part of feature values of metadata stored in a container corresponding to the container identifier.

The sparse index table is used to indicate correspondence between metadata and a container. For example, the sparse index table may indicate correspondence between a feature value of metadata and a container identifier (ID) or indicate correspondence between a part of feature values of metadata and a container ID. In this embodiment of the present invention, it is taken as an example that a feature value is a hash value and a sparse index table indicates correspondence between a part of feature values of metadata and a container identifier.

The sparse index table may be established when a new data block is written. For example, after a piece of metadata is sampled, a part of hash values of the metadata are used as an index, and no corresponding container ID is found in the sparse index table. In this case, the metadata can be written into a container, the container ID of the container into which the metadata is written is recorded in the sparse index table, and a location index of the container ID in the sparse index table is the part of hash values of the metadata.

Step 13: Select, according to the number of times that a same container identifier is found, a container corresponding to a container identifier that meets a set condition.

Selecting, according to the number of times that a same container ID is found, a container corresponding to a container identifier that meets a set condition may include the following. For found container identifiers, selecting containers, which correspond to a set number of container IDs in descending order of the number of times that a same container identifier is found, as containers meeting the set condition. For example, if six pieces of sampled metadata correspond to container ID1, five pieces of sampled metadata correspond to container ID2, and four pieces of sampled metadata correspond to container ID3, container identifiers in descending order of the number of times that a same container ID is found are container ID1, container ID2, and container ID3. If the set condition is selecting the top 2, the selected containers are container 1 corresponding to container ID1 and container 2 corresponding to container ID2. For found container identifiers, a specific policy for selecting a container corresponding to a container identifier that meets the set condition may be set according to different situations. For example, a threshold may be set, and a container corresponding to a container identifier is selected as a container meeting the set condition, where the number of times that the container identifier is found is greater than or equal to the threshold. In this embodiment, performing selection in descending order of the number of times that a same container identifier is found is only one of multiple possible methods.

A location index of each container identifier in the index table is at least a part of feature values of metadata stored in a container corresponding to the container identifier. For example, a first entry of the sparse index table records a container ID corresponding to a part of hash values equaling 1 of metadata, a second entry records a container ID corresponding to a part of hash values equaling 2 of metadata, and so on.

In this case, the size of the sparse index table is: (disk capacity/size of a block)×sampling rate×2, where being multiplied by 2 aims to reduce hash collision and improve index accuracy.

Memory space occupied by the sparse index table=size of the index table×8 (taking an example that each container ID occupies 64 bits) byte. Taking the disk capacity of 1 PB, a block size of 8 KB, and a sampling rate of $1/128$ as an example, the memory space occupied by the sparse index table is 16 GB.

A location index of each container identifier in the index table may be obtained by using the following method. Sample at least one piece of second metadata from metadata stored in a container, and use a feature value in the second metadata as a location index of the container identifier corresponding to the container in the sparse index table. Alternatively, use a part of feature values of the second metadata as a location index of the container identifier corresponding to the container in the sparse index table, where a feature value of each piece of the second metadata determines one location index.

It should be noted that in this embodiment of the present invention, a feature value of metadata needs to be used as an index for searching for the first metadata and a location index of a container identifier. Evidently, the algorithm of acquiring a feature value in the first metadata as an index and the algorithm of acquiring a feature value in the second metadata as a location index of a container identifier in the sparse index table need to be consistent with each other. For example, the first three bits of a feature value in the second metadata are selected as a location index of a container identifier in the sparse index table; accordingly, the first three bits of a feature value in the first metadata are selected as an index for searching for the first metadata. For another example, all feature values in the second metadata are selected as a location index of a container identifier in the sparse index table; accordingly, all feature values in the first metadata are selected as an index for searching for the first metadata.

In addition, at least one piece of second metadata is sampled from a container. If there are two or more than two pieces of second metadata, a feature value of each piece of the second metadata is capable of determining a location index of a container identifier. For example, it is taken as an example that all feature values in the second metadata are used as a location index of container A in the sparse index table and three pieces of the second metadata are sampled from container A. In this case, container A can be placed in three positions in the sparse index table, and indices of the locations are feature values of the second metadata.

Figure 3:
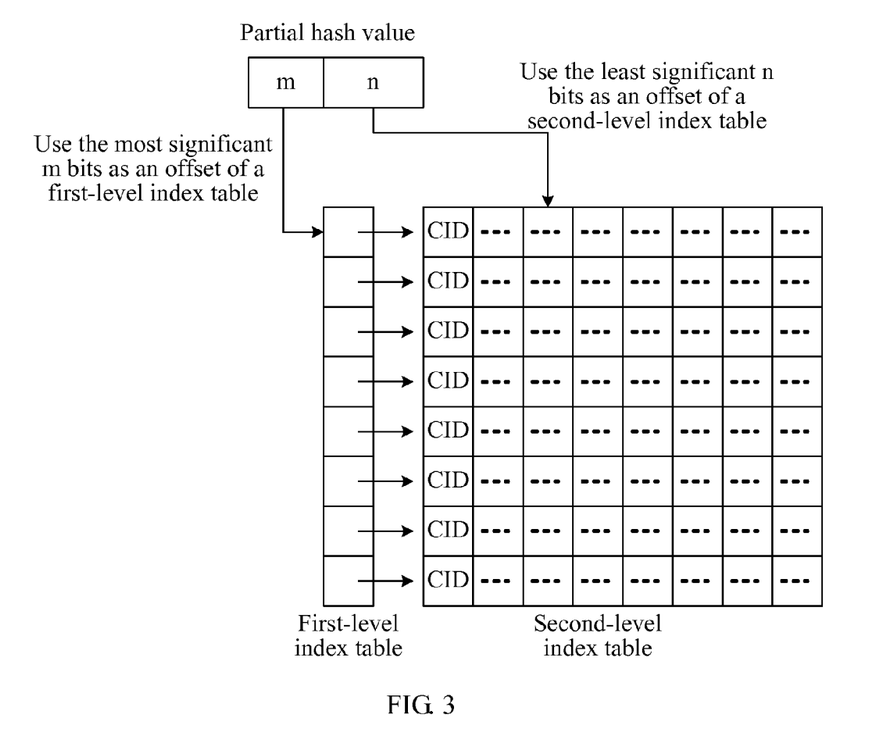
FIG. 3 is a schematic structural diagram of a sparse index table in the present invention.

A location index of a container ID in the sparse index table may further be determined in a two-dimensional manner. A two-dimensional schematic diagram of the location index may be as shown in FIG. 3. Taking an example that the location index is a part of hash values of sampled metadata, the most significant m bits of the part of hash values of the sampled metadata may be used to indicate an offset of a first-level index table and the least significant n bits of the part of hash values of the sampled metadata is used to indicate an offset of a second-level index table. In this case, $2^n$ indicates the size of the second-level index table, and $2^{n+m}$ indicates the size of the sparse index table. During calculation of n and m, n may be obtained by using $2^n$=memory space that can be allocated at a time by a system, and m is obtained according to the calculated n and $2^{n+m}$=memory space occupied by the sparse index table.

Adopting the two-dimensional array manner can avoid a memory space allocation failure caused by the need of allocating large memory space at a time. For example, the sparse index table needs 8G space, but only 1G space can be allocated at a time in a memory. In this case, 1G space is allocated at a time and a total of 8G space is allocated. In a two-dimensional array, it is assumed that an entry of a first-level index table is used as a row index and an entry of a second-level index table is used as a column index. In this case, the number of rows of the two-dimensional array is $2^m$, the number of columns is $2^n$, and entries of each first-level index table correspond to entries of $2^n$ second-level index tables. A container ID stored in row i, column j of the two-dimensional array corresponds to metadata in which the most significant m bits of a feature value equal i−1 and the least significant n bits of the feature value equal j−1, where i=1, . . . , $2^m$ and j=1, . . . , $2^n$. Further, when the memory space occupied by the sparse index table is smaller than the maximum memory space that can be allocated at a time by an operating system, organization can be performed in a one-dimensional array manner.

Step 14: Load metadata in the container meeting the set condition to a metadata cache.

In reference to FIG. 2, the container includes a metadata part and a data part. The metadata is loaded into a metadata cache.

Step 15: Search the metadata cache for a data block that is the same as the to-be-searched-for metadata.

The to-be-searched-for metadata is matched with the metadata in the metadata cache. If the to-be-searched-for metadata exists in the metadata cache, it indicates that the data block corresponding to the metadata is a duplicate block. Otherwise, it is a new block. Then, subsequent processing may be performed. For example, writing a new database into the container and deleting a duplicate data block.

In this embodiment, a sparse index table only records container IDs, and occupies relatively small space and can be placed in a memory. In this way, access to the sparse index table does not cause any disk IO operation, thereby improving metadata querying performance. This embodiment involves no Bloom filter, and the memory occupied by a sparse index table is significantly smaller than the memory occupied by a Bloom filter. Therefore, a requirement for a memory can be reduced.

Figure 4:
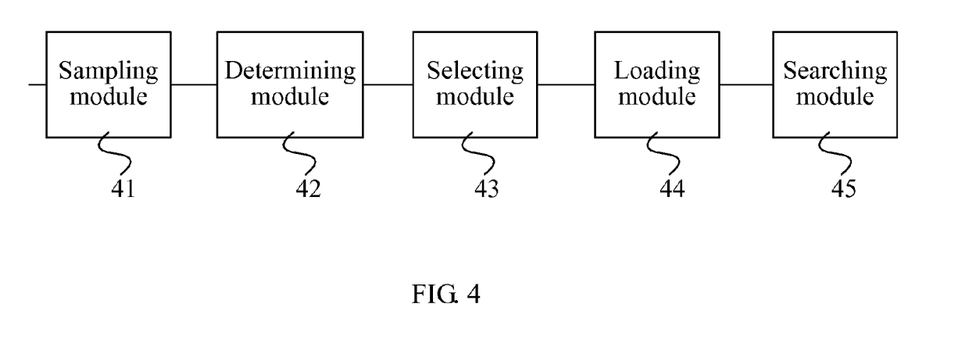
FIG. 4 is a schematic structural diagram of a metadata querying apparatus according to an embodiment of the present invention.

FIG. 4 is a schematic structural diagram of a metadata querying apparatus according to the present invention. The apparatus includes a sampling module 41, a determining module 42, a selecting module 43, a loading module 44, and a searching module 45. The sampling module 41 is configured to sample at least one piece of first metadata from to-be-searched-for metadata. The determining module 42 is configured to use at least a part of feature values in each piece of the sampled first metadata as an index, and search a sparse index table preset in a memory for a corresponding container identifier, where the sparse index table records container identifiers, and a location index of each container identifier in the index table is at least a part of feature values of metadata stored in a container corresponding to the container identifier. The selecting module 43 is configured to select, according to the number of times that a same container identifier is found, a container corresponding to a container identifier that meets a set condition. The loading module 44 is configured to load metadata in the selected container into a metadata cache. The searching module 45 is configured to search the metadata cache for a data block that is the same as the to-be-searched-for metadata.

Alternatively, the selecting module 43 is specifically configured to, for container identifiers that are found, select a set number of containers in descending order of the number of times that a same container identifier is found, as containers meeting the set condition.

Alternatively, the sampling module 41 is specifically configured to classify the to-be-searched-for metadata into multiple groups, sample one piece of metadata from each group, and use metadata with a smallest feature value in each group as sampled first metadata.

Figure 5:
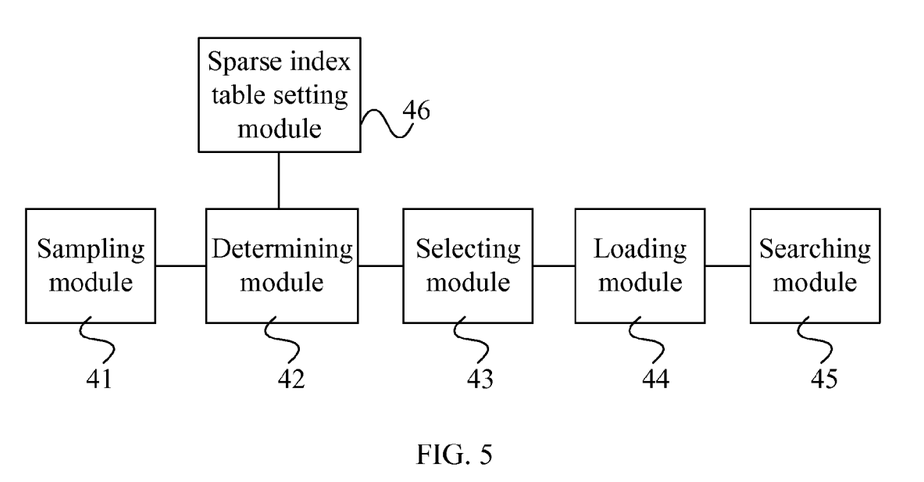
FIG. 5 is a schematic structural diagram of a metadata querying apparatus according to another embodiment of the present invention.

Alternatively, referring to FIG. 5, the apparatus may further include a sparse index table setting module 46, configured to sample at least one piece of second metadata from metadata stored in a container, use a feature value in the second metadata as a location index of a container identifier corresponding to the container in the sparse index table. Alternatively, the sparse table setting module 46 may be configured to use a part of feature values of the second metadata as a location index of the container identifier corresponding to the container in the sparse index table, where a feature value of each piece of the second metadata determines one location index.

Alternatively, that the sparse index table setting module 46 uses a feature value in the second metadata as a location index of a container identifier corresponding to the container in the sparse index table or uses a part of feature values of the second metadata as a location index of the container identifier corresponding to the container in the sparse index table specifically includes the following. Setting the sparse index table to a two-dimensional table formed by a first-level index offset indicating a row index and a second-level index offset indicating a column index. If the location index of the container identifier is a feature value of the sampled second metadata, setting the sparse index table determining the first-level index offset according to the most significant bits of the feature value of the second metadata, and determining the second-level index offset according to the least significant bits of the feature value of the second metadata. Alternatively, if the location index is a part of feature values of the second metadata, determining the first-level index offset according to the most significant bits of the part of feature values of the second metadata, and determining the second-level index offset according to the least significant bits of the part of feature values of the second metadata.

In this embodiment, a sparse index table occupies small space and can be placed in a memory. In this way, access to the sparse index table does not cause any disk IO operation, thereby improving metadata querying performance. This embodiment involves no Bloom filter, and the memory occupied by a sparse index table is significantly smaller than the memory occupied by a Bloom filter. Therefore, a requirement for a memory can be reduced.

Persons of ordinary skills in the art may understand that all or a part of the steps in each of the foregoing method embodiments may be implemented by a program instructing relevant hardware. The program may be stored in a computer readable storage medium. When the program runs, the steps of the forgoing method embodiments are performed. The foregoing storage medium includes any medium capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, a person of ordinary skills in the art should understand that modifications may still be made to the technical solutions described in the foregoing embodiments, or equivalent replacements may be made to some or all of the technical features thereof, without departing from the idea and scope of the technical solutions of the embodiments of the present invention.

What is claimed is:

1. A metadata querying method, comprising:
classifying the to-be-searched-for metadata into multiple groups;
sampling one piece of metadata with a smallest feature value from each group;
using at least a part of feature values in each piece of the first metadata obtained after the sampling as an index of each piece of first metadata respectively, and searching a sparse index table preset in a memory for finding container identifiers corresponding to the indices of the plurality of pieces of first metadata;
selecting, from the container identifiers corresponding to the indices of the plurality of pieces of first metadata according to the number of times that the container identifiers corresponding to the indices of the plurality of pieces of first metadata are found, a first container identifier that meets a set condition;
loading metadata in a container corresponding to the first container identifier into a metadata cache; and
searching the metadata cache for a data block that is the same as a data block in the to-be-searched-for metadata
wherein the sparse index table records a container identifier, and a location index of said container identifier in the sparse index table is at least a part of feature values of a piece of metadata stored in a container corresponding to the container identifier in the index table;
wherein the location index of a container identifier in the index table is obtained by using the following method:
sampling second metadata from metadata stored in a container, and at least one of:
using a feature value in the second metadata as a location index of a container identifier corresponding to the container from which the second metadata is sampled in the sparse index table; and
using a part of feature values of the second metadata as a location index of a container identifier corresponding to the container from which the second metadata is sampled in the sparse index table, wherein the location index is a location of the container identifier corresponding to the container from which the second metadata is sampled;
wherein the location index of a container identifier corresponding to the container from which the second metadata is sampled in the sparse index table is determined by a first-level index offset indicating a row index and a second-level index offset indicating a column index; and
when the location index of a container identifier corresponding to the container from which the second metadata is sampled in the sparse index table is a feature value of the sampled second metadata, the first-level index offset is determined according to the most significant bits of the feature value of the second metadata, and the second-level index offset is determined according to the least significant bits of the feature value of the second metadata; and
when the location index of a container identifier corresponding to the container from which the second metadata is sampled in the sparse index table is a part of feature values of the second metadata, the first-level index offset is determined according to the most significant bits of the part of feature values of the second metadata, and the second-level index offset is determined according to the least significant bits of the part of feature values of the second metadata.

2. The method according to claim 1, wherein the selecting, according to the number of times that the container identifiers corresponding to the indices of the plurality of pieces of first metadata are found, a first container identifier that meets a set condition from the container identifiers corresponding to the indices of the plurality of pieces of first metadata comprises:
selecting, after sorting the container identifiers in a descending order corresponding to the number of times each container identifier is found, a first container identifier, wherein the first container identifier is any one of the top N ordered container identifiers.

3. A metadata querying apparatus comprising a processor, a metadata cache and a non-transitory computer-readable storage medium including computer-executable instructions that when executed by the processor perform the method comprising:
classifying the to-be-searched-for metadata into multiple groups, and sampling one piece of metadata with a smallest feature value from each group;
using at least a part of feature values in each piece of the sampled first metadata as an index of each piece of first metadata respectively, searching a sparse index table preset in a memory for finding container identifiers corresponding to the indices of the plurality of pieces of first metadata, wherein the sparse index table records a container identifier, and a location index of said container identifier in the sparse index table is at least a part of feature values of metadata stored in a container corresponding to the container identifier in the index table;
selecting, according to the number of times that the container identifiers corresponding to the indices of the plurality of first metadata are found, a first container identifier that meets a set condition from the container identifiers corresponding to the indices of the plurality of pieces of first metadata;
loading metadata in containers corresponding to the first container identifiers into the metadata cache; and
searching the metadata cache for a data block that is the same as a data block in the to-be-searched-for metadata;
sampling a second piece of metadata from metadata stored in a container, and at least one of:
using a feature value in the second metadata as a location index of a container identifier corresponding to the container from which the second metadata is sampled in the sparse index table; and
using a part of feature values of the second metadata as a location index of a container identifier corresponding to the container from which the second metadata is sampled in the sparse index table, wherein the location index is location of the container identifier corresponding to the container from which the second metadata is sampled;
setting the sparse index table to a two-dimensional table formed by a first-level index offset indicating a row index and a second-level index offset indicating a column index;

when the location index of the container identifier is of a container identifier corresponding to the container from which the second metadata is sampled in the sparse index table a feature value of the sampled second metadata,
  determining the first-level index offset according to the most significant bits of the feature value of the second metadata, and
  determining the second-level index offset according to the least significant bits of the feature value of the second metadata; and
when the location index of a container identifier corresponding to the container from which the second metadata is sampled in the sparse index table is a part of feature values of the second metadata,
  determining the first-level index offset according to the most significant bits of the part of feature values of the second metadata, and
  determining the second-level index offset according to the least significant bits of the part of feature values of the second metadata.

4. The apparatus according to claim 3, wherein the non-transitory computer-readable storage medium further includes instructions for:
  selecting, after the container identifiers are sorted in a descending order according to the number of times a container identifier is found, the first container identifier, wherein the first container identifier is any one of the top N ordered container identifiers.

\* \* \* \* \*